US005690359A

United States Patent [19]

Teich

[11] Patent Number: 5,690,359
[45] Date of Patent: Nov. 25, 1997

[54] SUPPLEMENTARY WEIGHT FOR VEHICLE BALLASTING

[75] Inventor: Michael Teich, D-68199 Mannheim, Germany

[73] Assignee: Deere & Company, Moline, Ill.

[21] Appl. No.: 669,200

[22] Filed: Jun. 24, 1996

[30] Foreign Application Priority Data

Aug. 3, 1995 [DE] Germany .................. 195 28 476.3

[51] Int. Cl.$^6$ ...................................................... B60S 9/00
[52] U.S. Cl. ........................................... 280/759; 212/195
[58] Field of Search ..................... 280/758, 759; 212/196, 195, 197, 198; 414/673, 719

[56] References Cited

U.S. PATENT DOCUMENTS

| 3,635,493 | 1/1972 | Barth et al. ................ 280/759 |
| 4,067,415 | 1/1978 | Samide ....................... 280/759 |
| 4,232,883 | 11/1980 | Bourgeous et al. ........... 280/759 |
| 4,377,300 | 3/1983 | Old ............................. 280/758 |
| 4,659,102 | 4/1987 | Stuhrmann .................. 280/759 |
| 5,642,309 | 10/1995 | Jeffers et al. ................ 280/759 |

FOREIGN PATENT DOCUMENTS

| 2512801 | 9/1976 | European Pat. Off. ....... 280/759 |
| 315595 | 5/1989 | European Pat. Off. ....... 280/758 |
| 2059208 | 6/1980 | Germany . |
| 3314684 | 10/1984 | Germany . |

*Primary Examiner*—Paul N. Dickson

[57] ABSTRACT

A supplementary weight for ballasting a work vehicle includes locating pins which project therefrom. The weight has a pin bore which receives the locating pins and the locating pins are at least partially retractable into the weight. The supplementary weight is preferably comprised of a plurality of partial weights, each having a pin bore extending therethrough, and a central tube is received by the pin bores and couples the partial weights together, the locating pins being adjustably mounted in the central tube. A central tube extends through the pin bore which extends through the supplementary weight, and clamping devices are attached to ends of the central tube for clamping the supplementary weight on the central tube. Recesses are formed in outer side surfaces of the supplementary weight and the clamping devices are located at least partially within the recesses.

13 Claims, 2 Drawing Sheets

SUPPLEMENTARY WEIGHT FOR VEHICLE BALLASTING

BACKGROUND OF THE INVENTION

The invention relates to a supplementary weight for the ballasting of an agricultural or industrial vehicle, and in particular to such a weight with side-projecting locating pins.

The use of larger and heavier implements requires the installation of larger and heavier supplementary weights, in order to balance the loading from the implements. The supplementary weights should be able to be installed flexibly, so that it is possible, if necessary, to install and remove the weights rapidly, as well as to apply the weight as front or rear weight permitting rapid rebuilding under varying application requirements. Because of the heavy weight of such supplementary weights, for example, 900 kg., it is necessary to use lifting devices or to assemble the supplementary weight from individual removable components.

With weights that are handled as a unit, side-projecting locating pins are used to locate the unit on a lifting device. A front or rear three-point implement hitch may be used to locate the unit. But, then the hitch is not available for the attachment of other implements, unless the supplementary weight is removed.

Furthermore, side-projecting locating pins may interfere with handling and storage, may represent a danger of injury to the operator, and are susceptible to damage under rough operating conditions. Finally, it is known practice to attach the locating pins to the sides of the supplementary weights with flanges and screws. This requires removing the locating pins or unscrewing them. This is time-consuming and requires the use of tools which must be stored together with the attaching hardware.

From DE-AS-20 59 208 an arrangement is known for the attachment of a ballast weight to a tractor, wherein the ballast weight consists of several individual weights that can be hooked into each other by means of projections and corresponding recesses. From the sides of each weight segment, attaching devices project that are used for the attachment to various types of implement coupling arrangements. The attaching devices are configured as coupling trunnions that are mounted in recesses in the side surfaces of the weights. Here there also is the danger of injury and damage.

SUMMARY OF THE INVENTION

Accordingly, an object of this invention is to provide a supplementary weight with side projecting locating pins which is simple to install and which overcomes the problems noted above.

These and other objects are achieved by the present invention, wherein a supplementary weight is provided with bores that receive locating pins, and wherein the side-projecting ends of the locating pins are recessed at least partially in the supplementary weight. As a result, the recessed locating pins are safe and do not require time consuming disassembly with special tools.

If the supplementary weight is configured as a multi-piece assembly, this offers advantages in casting technology since a more rapid cooling of the casting is possible. By installing a central tube in bores in the partial weights, the partial weights can be assembled into a single unit, and the central tube receives the locating pins.

It is also advantageous to configure the locating pins so as to be adjustable, so that they can be made to conform to varying lifting devices and variations in tolerances.

Screw threads and nuts on the ends of the central tube, make it possible to fasten the central tube to the supplementary weight and secure the central tube against shifting, and to clamp the partial weights in the axial direction of the central tube.

Preferably, depressions are provided on the outer surfaces of the supplementary weight which accommodate the nuts within the outer contour of the supplementary weight, thereby reducing the danger of injury resulting from the protruding nuts and damage to the nuts.

Preferably, the bore of at least one outer partial weight has a larger diameter than that Of the bore of a central partial weight, and a spacer tube is arranged between the central tube and the bore of the outer partial weight. This makes it possible to clamp the partial weights to the central tube even after the removal of one of the outer partial weights, and thereby makes possible a differential ballasting of the agricultural tractor.

Corresponding projections and recesses on the surfaces of the partial weights engage each other to prevent the partial weights from rotating relative to one another.

DETAILED DESCRIPTION

Figure 1:
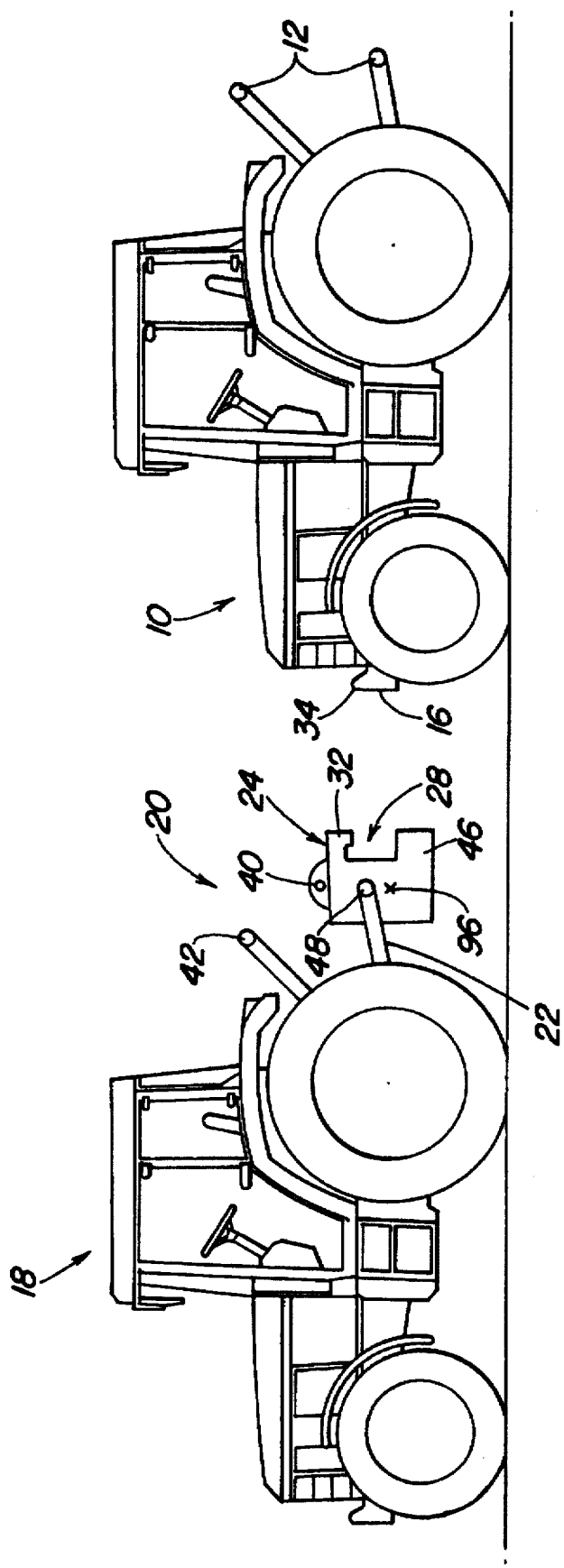
FIG. 1 is a side view of two agricultural tractors, where a supplementary weight is hooked onto the rear three-point hitch of one of the tractor for the purpose of being installed onto the base weight of the other tractor.

FIG. 1 shows an agricultural tractor 10 with a rear three-point hitch 12 and a base weight 16 attached to its front end. Also shown is a second agricultural tractor 18 which is also equipped with a three-point hitch 20. A supplementary weight 24 is carried by the lower steering arms 22 of hitch 20, so that it can be hooked into the base weight 16 of tractor 10.

On the side facing the base weight 16, the supplementary weight 24 includes a mounting recess 28. From the upper end of the recess 28 projects a downward extending hook projection 32 for hooking the supplementary weight 24 onto the base weight 16, which has corresponding upwardly extending projection 34. Instead of a rear hitch 20 as shown, the weight 24 could also be picked up by a front attaching arrangement or by any other appropriate lifting device and hooked into the base weight 16.

An eye 40 is provided on the upper side of the supplementary weight so that it can be hooked onto the upper steering arm 42 of the hitch 20. This may be useful if the supplementary weight 24 is to be rigidly attached to the hitch 20 as a rear balance weight, or if it is to remain on a front attaching arrangement because the tractor 10 is not equipped with a base weight 16 that can be appropriately hooked onto.

Locating pins 44 project from the sides surfaces 46 of the supplementary weight 24. The pins 44 can be picked up by the hook 48 of the lower steering arms 22. In order to make the locating pins 44 conform to particular three-point hitches, ball-shaped adapters (not shown) may be applied to the locating pins 44 which conform to the particular hook.

Each locating pin 44 includes an inner threaded section 66, a central guide section 68, and an outer section 70 for coupling to the hitch 12.

The locating pins 44 are situated above the center of gravity 96 of the supplementary weight 24, so that it swings as a pendulum into a stable position when the locating pins 44 are picked up by the lower steering arms 22 of the three-point hitch 20. This makes it easier to mount weight 24 on the base weight 16 and helps prevent any tilting or overturning.

When the supplementary weight 24 is put aside or if it is hooked onto the base weight 16, the locating pins 44 are no longer used. Therefore, the locating pins 44 of the supplementary weight 24 are configured in such a way that they can be retracted into the interior of the supplementary weight 24.

Figure 2:
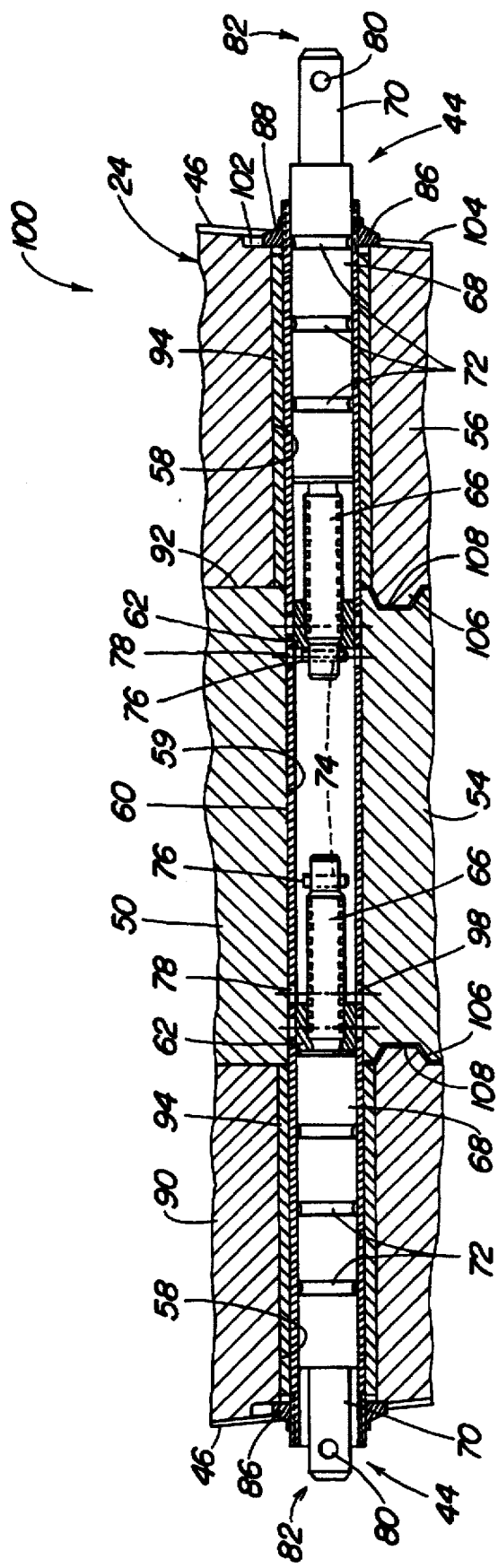
FIG. 2 is a cross-sectional view of a supplementary weight according to the present invention showing on the right a locating pin in an assembly position, and showing on the left a locating pin in a recessed position.

Referring now to FIG. 2, the supplementary weight includes three partial weights 52, 54, 56, with horizontal bores 58, 59 extending through all three components. A central tube 60 is inserted into the bores 58, 59. Both ends of the central tube 60 are provided with external threads 88 for receiving nuts 86 for clamping the partial weights 52, 54, 56 on the central tube 60 and against each other. Preferably, these nuts 86 are located in depressions 102 on the side surfaces 46 of the supplementary weight 24, so that they do not project far beyond the outer side surface 104. In order to prevent rotation of the partial weights 52, 54, 56 with respect to each other, weight 54 has recesses 108 which receive corresponding tabs 106 which project from the other weights.

If only the central weight 54 is used, then spacer tubes 94 can be slid onto the central tube 60 on both sides of the central weight 54. For this purpose, the bores 58 in the outer weights 52, 56 have a larger diameter than the bore 59 in the central weight 54, in order to accommodate the spacer tubes 94. If only one of the outer weights 52 or 56 is mounted, or if both outer weights 52, 56 are not mounted, then the mounted weights are clamped to the central tube 60 by use of the spacer tubes 94 and the nuts 86 which are screwed onto the ends of the central tube 60.

Two internally threaded bushings 62 are inserted into and fastened to the interior of the central tube 60. Pins (not shown) are inserted through transverse bores 98 in the central tube 60 so as to limit the depth of insertion of the bushings 62. When the bushings 62 have made contact with the pin (not shown), the bushings 62 are welded to an inside wall of the tube 60. The locating pins 44 have smaller diameter outside threaded sections 66 which are then screwed into the threaded bushings 62. The locating pins 44 are secured by inserting a slotted hollow spring pin 76 through bores 78 in the central tube 60 and through bores 74 in each of the sections 66.

The central section 68 of each pin 44 is inserted into the central tube 60 and carries the load of the weight 24 and guides the locating pin 44 during its assembly and disassembly. Several ring-shaped concentric grooves 72 are provided in the central section 68 and permit lubrication as well as removal of dirt particles that are usually encountered in operation in the field.

The outer section 70 of each pin 44 is preferably configured so that it may be coupled to the hitch 12. However, it could be configured to be coupled to other lifting arrangements. The threaded connection between inner section 66 and bushing 62 permits adjustments to accommodate differences due to tolerances between different hitch lower links. A transverse bore 80 is provided in each locating section 70 for inserting a pin, screwdriver or other simple device to assist in rotating the pins 44 to screw them into and out of the weights 24.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A supplementary weight for ballasting a work vehicle, the weight having locating pins projecting therefrom, wherein:

the supplementary weight has a pin bore which receives the locating pins and the locating pins are at least partially retractable into the weight, the supplementary weight is comprised of a plurality of partial weights, each having a pin bore extending laterally therethrough; and a central tube is received by the pin bores and couples the partial weights together, the locating pins being adjustably mounted in the central tube.

2. The supplementary weight of claim 1, wherein:

clamping devices are attached to ends of the central tube for clamping the supplementary weight on the central tube.

3. The supplementary weight of claim 2, wherein:

recesses are formed in outer side surfaces of the supplementary weight and the clamping devices are located at least partially within the recesses.

4. The supplementary weight of claim 2, wherein:

the ends of the central tube are provided with external threads and the clamping devices comprise nuts which are screwed on to the threaded ends of the central tube.

5. The supplementary weight of claim 1, wherein:

the supplementary weight is comprised of a central partial weight and a pair of outer partial weights;

the outer partial weight having pin bores which have a larger diameter than a central partial weight pin bore; and a spacer tube is mounted on the central tube and is received by the outer partial weight pin bore.

6. The supplementary weight of claim 1, wherein:

adjacent partial weights have mating recesses and projections to prevent rotation of one partial weight with respect to another.

7. The supplementary weight of claim 1, wherein:

the supplementary weight has a threaded bore therein; and each locating pin has a threaded section which can be screwed into the threaded bore in order to retract each locating pin within the weight.

8. The supplementary weight of claim 2, wherein:

each locating pin comprises a cylindrical guide section which is slidably received by the central tube, a locating section which projects outwardly from the guide section for coupling to a lifting arrangement, and a threaded section projecting inwardly from the guide section; and a threaded bushing is mounted in the central tube, the threaded section of each locating pin being screwable into the bushing.

9. The supplementary weight of claim 8, wherein:

at least one cylindrical groove is formed on the outer surface of the guide section.

10. The supplementary weight of claim 1, wherein:

a transverse bore extends through an outer end of the locating pin for receiving a tool for rotating the locating pin.

11. The supplementary weight of claim 8, wherein:

a transverse bore extends through an inner end of the locating pin; and a retaining device is inserted into the transverse bore to prevent complete removal of the locating pin from the weight.

12. The supplementary weight of claim 11, wherein:

a central tube extends through the pin bore, the central tube having an opening through which the retaining device is inserted.

13. The supplementary weight of claim 1, wherein:

a pair of locating pins are aligned with each other along a generally horizontal alignment axis, and said axis located at a level higher than a center of gravity of the supplementary weight.

* * * * *

UNITED STATES PATENT AND TRADEMARK OFFICE
CERTIFICATE OF CORRECTION

PATENT NO. : 5,690,359
DATED      : 25 November 1997
INVENTOR(S): Michael Teich

It is certified that error appears in the above-indentified patent and that said Letters Patent is hereby corrected as shown below:

Column 4 line 40, delete "weight" and insert -- weights --.

Column 4 line 44, delete "bore" and insert -- bores --.

Signed and Sealed this

Fourteenth Day of July, 1998

Attest:

BRUCE LEHMAN

Attesting Officer   Commissioner of Patents and Trademarks